United States Patent
Sono et al.

(10) Patent No.: US 8,474,431 B2
(45) Date of Patent: Jul. 2, 2013

(54) DIRECT FUEL-INJECTED ENGINE

(75) Inventors: Hiroshi Sono, Wako (JP); Tatsuya Uchimoto, Wako (JP); Yukihisa Yamaya, Wako (JP); Kenichiro Ikeya, Wako (JP); Yutaka Tajima, Wako (JP); Mitsuhiro Shibata, Wako (JP); Nobuhiko Sasaki, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 939 days.

(21) Appl. No.: 12/532,984

(22) PCT Filed: Apr. 3, 2008

(86) PCT No.: PCT/JP2008/056710
§ 371 (c)(1),
(2), (4) Date: Sep. 24, 2009

(87) PCT Pub. No.: WO2008/126771
PCT Pub. Date: Oct. 23, 2008

(65) Prior Publication Data
US 2010/0108022 A1    May 6, 2010

(30) Foreign Application Priority Data

Apr. 6, 2007 (JP) .................................. 2007-100644
Apr. 6, 2007 (JP) .................................. 2007-100645

(51) Int. Cl.
*F02F 3/26* (2006.01)
*F02F 3/24* (2006.01)
*F02B 5/00* (2006.01)

(52) U.S. Cl.
USPC ............................ 123/276; 123/305; 123/307

(58) Field of Classification Search
USPC ................. 123/260, 261, 263, 276, 279, 295, 123/298, 661
See application file for complete search history.

(56) References Cited

U.S. PATENT DOCUMENTS 4,958,604 A * 9/1990 Hashimoto .................... 123/276
6,158,409 A * 12/2000 Gillespie et al. ........... 123/193.6

(Continued)

FOREIGN PATENT DOCUMENTS

EP    2 034 157 A1    3/2009
EP    2 039 905 A1    3/2009

(Continued)

*Primary Examiner* — Stephen K Cronin
*Assistant Examiner* — Sizo Vilakazi
(74) *Attorney, Agent, or Firm* — Arent Fox LLP

(57) ABSTRACT

In a cross section in which squish flow from an outer peripheral part of a piston (13) toward a cavity (25) is large due to a width (W2) of a squish area (SA) being large and a squish clearance (C2) being small, a collision angle ($\alpha 2$) at which a fuel injection axis (Li2) collides with the cavity (25) is made large, whereas in a cross section in which squish flow is small due to the width of the squish area (SA) being small and the squish clearance being large, the collision angle at which a fuel injection axis collides with the cavity (25) is made small. This enables a tendency for fuel to flow out to the exterior of the cavity (25) in a cross section where the squish flow is small to be weakened, and a tendency for fuel to flow out to the exterior of the cavity (25) in a cross section where the squish flow is large to be strengthened, thereby making the conditions in which fuel and air are mixed uniform throughout the entire region of the cavity (25).

14 Claims, 12 Drawing Sheets

U.S. PATENT DOCUMENTS

| | | | |
|---|---|---|---|
| 6,553,960 B1* | 4/2003 | Yoshikawa et al. | 123/299 |
| 7,104,247 B2* | 9/2006 | Hiraya et al. | 123/276 |
| 2003/0145823 A1* | 8/2003 | Wirth | 123/276 |
| 2009/0205607 A1* | 8/2009 | Levy | 123/276 |
| 2009/0314253 A1* | 12/2009 | Sono et al. | 123/298 |
| 2010/0006061 A1* | 1/2010 | Shibata et al. | 123/307 |
| 2010/0108022 A1* | 5/2010 | Sono et al. | 123/276 |
| 2010/0147260 A1* | 6/2010 | Yamaguchi et al. | 123/276 |

FOREIGN PATENT DOCUMENTS

| | | | |
|---|---|---|---|
| JP | 62-255520 A | 11/1987 |
| JP | 62-255524 A | 11/1987 |
| JP | 63-016124 A | 1/1988 |
| JP | 8-121171 A | 5/1996 |
| JP | 8-296442 A | 11/1996 |
| JP | 2002-122024 A | 4/2002 |
| JP | 2003-328759 A | 11/2003 |
| JP | 2004-270476 A | 9/2004 |
| JP | 2008-002443 A | 1/2008 |
| WO | WO 2008/001534 A1 | 1/2008 |
| WO | WO 2008/004398 A1 | 1/2008 |

* cited by examiner

CROSS SECTION IN DIRECTION INTERSECTING PISTON PIN AT 60°

CROSS SECTION IN DIRECTION INTERSECTING PISTON PIN AT 60°

DIRECT FUEL-INJECTED ENGINE

TECHNICAL FIELD

The present invention relates to a direct fuel-injection engine that includes a piston having a top face with a height that varies in the circumferential direction, a cavity recessed in a central part of the piston, and a fuel injector for injecting fuel along a plurality of fuel injection axes oriented in a plurality of directions spaced in the circumferential direction within the cavity.

BACKGROUND ART

Direct fuel-injection diesel engines generally have a piston with a top face formed so as to be flat, but a direct fuel-injection diesel engine in which a piston top face projects in a pentroof shape is known from Patent Publication 1 below.

When a cavity is recessed in the top face of a pentroof-shaped piston, the height of the opening of the cavity changes in the circumferential direction. Therefore, if the height of a bottom wall portion of the cavity is made constant in the circumferential direction, the depth of a peripheral wall portion of the cavity changes in the circumferential direction, the conditions in which fuel injected from a fuel injector and air are mixed becomes nonuniform in the circumferential direction, and there are the problems that engine output decreases and harmful exhaust materials increase.

In order to solve these problems, in the arrangement described in Patent Publication 1, the height of the bottom wall portion of the cavity is changed so as to follow the change in the height of the opening of the cavity, thus making the depth of the peripheral wall portion uniform in the circumferential direction, and thereby making the conditions in which fuel and air are mixed within the cavity uniform in the circumferential direction. Patent Publication 1: Japanese Patent Application Laid-open No. 62-255520

DISCLOSURE OF INVENTION

Problems to be Solved by the Invention

The present applicant has proposed in Japanese Patent Application No. 2006-175597 an arrangement in which, in order to make the conditions in which fuel and air are mixed uniform in the circumferential direction of the cavity, the cross-sectional shape of the cavity is made identical for any cross section that is perpendicular to the top face of the piston and that passes through a fuel injection point of the fuel injector.

However, even if the cross-sectional shape of the cavity is made identical as described above, in a diesel engine equipped with a pentroof-shaped piston the magnitude of squish flow easily becomes nonuniform in the circumferential direction, and there is a possibility that in a portion where the squish flow is small fuel will flow out from the cavity or in a portion where the squish flow is large fuel will be pushed to the bottom of the cavity, thus degrading the combustion conditions for the gas mixture.

Furthermore, when the piston starts to descend from top dead center, since the magnitude of reverse squish flow flowing from the cavity toward the outer peripheral part of the piston easily becomes nonuniform in the circumferential direction, there is a possibility that in a portion where the reverse squish flow is small fuel will remain in the bottom of the cavity or in a portion where the reverse squish flow is large fuel will flow out to the exterior of the cavity, thus degrading the combustion conditions for the gas mixture.

The present invention has been accomplished in the light of the above-mentioned circumstances, and it is an object thereof to make the conditions in which fuel and air are mixed within a cavity uniform even if the magnitude of squish flow or the magnitude of reverse squish flow is nonuniform in the circumferential direction in a direct fuel-injection engine.

Means for Solving the Problems

In order to attain the above object, according to a first aspect of the present invention, there is provided a direct fuel-injection engine comprising a piston having a top face with a height that varies in the circumferential direction, a cavity recessed in a central part of the piston, and a fuel injector for injecting fuel along a plurality of fuel injection axes oriented in a plurality of directions spaced in the circumferential direction within the cavity, characterized in that the magnitude of squish flow changes in the circumferential direction, and a second collision angle at which a second fuel injection axis, oriented in a direction in which the squish flow is large, collides with the cavity is set larger than a first collision angle at which a first fuel injection axis, oriented in a direction in which the squish flow is small, collides with the cavity.

According to a second aspect of the present invention, there is provided a direct fuel-injection engine comprising a piston having a top face with a height that varies in the circumferential direction, a cavity recessed in a central part of the piston, and a fuel injector for injecting fuel along a plurality of fuel injection axes oriented in a plurality of directions spaced in the circumferential direction within the cavity, characterized in that a squish area changes in the circumferential direction, and a second collision angle at which a second fuel injection axis, oriented in a direction in which the squish area is large, collides with the cavity is set larger than a first collision angle at which a first fuel injection axis, oriented in a direction in which the squish area is small, collides with the cavity.

According to a third aspect of the present invention, there is provided a direct fuel-injection engine comprising a piston having a top face with a height that varies in the circumferential direction, a cavity recessed in a central part of the piston, and a fuel injector for injecting fuel along a plurality of fuel injection axes oriented in a plurality of directions spaced in the circumferential direction within the cavity, characterized in that a width of a squish area changes in the circumferential direction, and a second collision angle at which a second fuel injection axis, oriented in a direction in which the width is large, collides with the cavity is set larger than a first collision angle at which a first fuel injection axis, oriented in a direction in which the width is small, collides with the cavity.

According to a fourth aspect of the present invention, there is provided a direct fuel-injection engine comprising a piston having a top face with a height that varies in the circumferential direction, a cavity recessed in a central part of the piston, and a fuel injector for injecting fuel along a plurality of fuel injection axes oriented in a plurality of directions spaced in the circumferential direction within the cavity, characterized in that the ridge length of a squish area changes in the circumferential direction, and a second collision angle at which a second fuel injection axis, oriented in a direction in which the ridge length is large, collides with the cavity is set larger than a first collision angle at which a first fuel injection axis, oriented in a direction in which the ridge length is small, collides with the cavity.

According to a fifth aspect of the present invention, there is provided a direct fuel-injection engine comprising a piston having a top face with a height that varies in the circumferential direction, a cavity recessed in a central part of the piston, and a fuel injector for injecting fuel along a plurality of fuel injection axes oriented in a plurality of directions spaced in the circumferential direction within the cavity, characterized in that a squish clearance changes in the circumferential direction, and a second collision angle at which a second fuel injection axis, oriented in a direction in which the squish clearance is small, collides with the cavity is set larger than a first collision angle at which a first fuel injection axis, oriented in a direction in which the squish clearance is large, collides with the cavity.

According to a sixth aspect of the present invention, in addition to any one of the first to fifth aspects, the second collision angle is at least 90°.

According to a seventh aspect of the present invention, in addition to any one of the first to fifth aspects, a cross section of the cavity that passes through an $n^{th}$ fuel injection axis is defined as a fuel injection cross section Sn, an intersection point of the fuel injection cross section Sn with the opening peripheral edge of the cavity is defined as a first specific point An, a second specific point Bn is present on a line that passes through the first specific point An and is parallel to a lower face of a cylinder head in the fuel injection cross section Sn, a third specific point Cn is present on a bottom wall portion of the cavity in the fuel injection cross section Sn, the second specific point Bn is at a position closer to a piston central axis than to the first specific point An, the third specific point Cn is at a position closer to the piston central axis than to a position of the maximum outer diameter of the bottom wall portion of the cavity, and a cross-sectional shape surrounded by a path AnBn connecting the first and second specific points An and Bn by a line along the lower face of the cylinder head in the fuel injection cross section Sn, a path AnCn connecting the first and third specific points An and Cn along a wall face of the cavity in the fuel injection cross section Sn, and a path BnCn connecting the second and third specific points Bn and Cn by the shortest straight line is substantially equal for each fuel injection cross section Sn.

According to an eighth aspect of the present invention, in addition to any one of the first to fifth aspects, fuel injected by the fuel injector collides with the cavity before the piston reaches top dead center.

According to a ninth aspect of the present invention, there is provided a direct fuel-injection engine comprising a piston having a top face with a height that varies in the circumferential direction, a cavity recessed in a central part of the piston, and a fuel injector for injecting fuel along a plurality of fuel injection axes oriented in a plurality of directions spaced in the circumferential direction within the cavity, characterized in that the magnitude of reverse squish flow changes in the circumferential direction, and a second fuel injection angle formed by a second fuel injection axis, oriented in a direction in which the reverse squish flow is large, relative to the direction of the open end of the cavity is set larger than a first fuel injection angle formed by a first fuel injection axis, oriented in a direction in which the reverse squish flow is small, relative to the direction of the open end of the cavity.

According to a tenth aspect of the present invention, there is provided a direct fuel-injection engine comprising a piston having a top face with a height that varies in the circumferential direction, a cavity recessed in a central part of the piston, and a fuel injector for injecting fuel along a plurality of fuel injection axes oriented in a plurality of directions spaced in the circumferential direction within the cavity, characterized in that a squish area changes in the circumferential direction, and a second fuel injection angle formed by a second fuel injection axis, oriented in a direction in which the squish area is large, relative to the direction of the open end of the cavity is set larger than a first fuel injection angle formed by a first fuel injection axis, oriented in a direction in which the squish area is small, relative to the direction of the open end of the cavity.

According to an eleventh aspect of the present invention, there is provided a direct fuel-injection engine comprising a piston having a top face with a height that varies in the circumferential direction, a cavity recessed in a central part of the piston, and a fuel injector for injecting fuel along a plurality of fuel injection axes oriented in a plurality of directions spaced in the circumferential direction within the cavity, characterized in that a width of a squish area changes in the circumferential direction, and a second fuel injection angle formed by a second fuel injection axis, oriented in a direction in which the width is large, relative to the direction of the open end of the cavity is set larger than a first fuel injection angle formed by a first fuel injection axis, oriented in a direction in which the width is small, relative to the direction of the open end of the cavity.

According to a twelfth aspect of the present invention, there is provided a direct fuel-injection engine comprising a piston having a top face with a height that varies in the circumferential direction, a cavity recessed in a central part of the piston, and a fuel injector for injecting fuel along a plurality of fuel injection axes oriented in a plurality of directions spaced in the circumferential direction within the cavity, characterized in that a ridge length of a squish area changes in the circumferential direction, and a second fuel injection angle formed by a second fuel injection axis, oriented in a direction in which the ridge length is large, relative to the direction of the open end of the cavity is set larger than a first fuel injection angle formed by a first fuel injection axis, oriented in a direction in which the ridge length is small, relative to the direction of the open end of the cavity.

According to a thirteenth aspect of the present invention, there is provided a direct fuel-injection engine comprising a piston having a top face with a height that varies in the circumferential direction, a cavity recessed in a central part of the piston, and a fuel injector for injecting fuel along a plurality of fuel injection axes oriented in a plurality of directions spaced in the circumferential direction within the cavity, characterized in that a squish clearance changes in the circumferential direction, and a second fuel injection angle formed by a second fuel injection axis, oriented in a direction in which the squish clearance is small, relative to the direction of the open end of the cavity is set larger than a first fuel injection angle of a first fuel injection axis, oriented in a direction in which the squish clearance is large, relative to the direction of the open end of the cavity.

According to a fourteenth aspect of the present invention, in addition to any one of the ninth to thirteenth aspects, a cross section of the cavity that passes through an $n^{th}$ fuel injection axis is defined as a fuel injection cross section Sn, an intersection point of the fuel injection cross section Sn with the opening peripheral edge of the cavity is defined as a first specific point An, a second specific point Bn is present on a line that passes through the first specific point An and is parallel to a lower face of a cylinder head in the fuel injection cross section Sn, a third specific point Cn is present on a bottom wall portion of the cavity in the fuel injection cross section Sn, the second specific point Bn is at a position closer to a piston central axis than to the first specific point An, the third specific point Cn is at a position closer to the piston central axis than to a position of the maximum outer diameter of the bottom wall portion of the cavity, and a cross-sectional shape surrounded by a path AnBn connecting the first and second specific points An and Bn by a line along the lower face of the cylinder head in the fuel injection cross section Sn, a path AnCn connecting the first and third specific points An and Cn along a wall face of the cavity in the fuel injection cross section Sn, and a path BnCn connecting the second and third specific points Bn and Cn by the shortest straight line is substantially equal for each fuel injection cross section Sn.

Effects of the Invention

In accordance with the first aspect of the present invention, even if the magnitude of squish flow from an outer peripheral part of the piston toward the cavity changes in the circumferential direction, since the first collision angle becomes small in a direction in which the squish flow is small to thus weaken a tendency for fuel to flow out to the exterior of the cavity, and the second collision angle becomes large in a direction in which the squish flow is large to thus strengthen the tendency for fuel to flow out to the exterior of the cavity, it is possible to make the conditions in which fuel and air are mixed uniform throughout the whole region of the cavity regardless of the size of the squish flow.

Furthermore, in accordance with the second aspect of the present invention, even if the magnitude of squish flow from an outer peripheral part of the piston toward the cavity changes in the circumferential direction due to the squish area changing in the circumferential direction, since the first collision angle becomes small in a direction in which the squish flow is small (that is, a direction in which the squish area is small) to thus weaken the tendency for fuel to flow out to the exterior of the cavity, and the second collision angle becomes large in a direction in which the squish flow is large (that is, a direction in which the squish area is large) to thus strengthen the tendency for fuel to flow out to the exterior of the cavity, it is possible to make the conditions in which fuel and air are mixed uniform throughout the whole region of the cavity regardless of the size of the squish flow.

Moreover, in accordance with the third aspect of the present invention, even if the magnitude of squish flow from an outer peripheral part of the piston toward the cavity changes in the circumferential direction due to the width of the squish area changing in the circumferential direction, since the first collision angle becomes small in a direction in which the squish flow is small (that is, a direction in which the width of the squish area is small) to thus weaken the tendency for fuel to flow out to the exterior of the cavity, and the second collision angle becomes large in a direction in which the squish flow is large (that is, in a direction in which the width of the squish area is large) to thus strengthen the tendency for fuel to flow out to the exterior of the cavity, it is possible to make the conditions in which fuel and air are mixed uniform throughout the whole region of the cavity regardless of the size of the squish flow.

Furthermore, in accordance with the fourth aspect of the present invention, even if the magnitude of squish flow from an outer peripheral part of the piston toward the cavity changes in the circumferential direction due to the ridge length of the squish area changing in the circumferential direction, since the first collision angle becomes small in a direction in which the squish flow is small (that is, in a direction in which the ridge length of the squish area is small) to thus weaken the tendency for fuel to flow out to the exterior of the cavity, and the second collision angle becomes large in a direction in which the squish flow is large (that is, in a direction in which the ridge length of the squish area is large) to thus strengthen the tendency for fuel to flow out to the exterior of the cavity, it is possible to make the conditions in which fuel and air are mixed uniform throughout the whole region of the cavity regardless of the size of the squish flow.

Moreover, in accordance with the fifth aspect of the present invention, even if the magnitude of squish flow from an outer peripheral part of the piston toward the cavity changes in the circumferential direction due to the squish clearance changing in the circumferential direction, since the first collision angle becomes small in a direction in which the squish flow is small (that is, a direction in which the squish clearance is large) to thus weaken the tendency for fuel to flow out to the exterior of the cavity, and the second collision angle becomes large in a direction in which the squish flow is large (that is, a direction in which the squish clearance is small) to thus strengthen the tendency for fuel to flow out to the exterior of the cavity, it is possible to make the conditions in which fuel and air are mixed uniform throughout the whole region of the cavity regardless of the size of the squish flow.

Furthermore, in accordance with the sixth aspect of the present invention, since fuel that has collided with the cavity at the second collision angle of at least 90° flows toward the opening by being guided by the wall face of the cavity, the fuel is not pushed back by a large squish flow and can diffuse uniformly within the cavity.

Moreover, in accordance with the seventh aspect of the present invention, when fuel is injected along a plurality of fuel injection axes from the fuel injector disposed on the piston central axis within the cavity recessed in a central part of the piston whose top face height changes in the circumferential direction, the cross section of the cavity that passes through the $n^{th}$ fuel injection axis is defined as the fuel injection cross section Sn, and since the cross-sectional shape of the cavity defined by first to third specific points An, Bn, and Cn on the fuel injection cross section Sn is set so as to be substantially equal for each fuel injection cross section Sn, it is possible to make the conditions in which fuel and air are mixed in fuel injection cross sections Sn uniform, thus increasing the engine output and reducing harmful exhaust substances. Furthermore, since the angle formed by the edge of the opening of the cavity in a portion where the top face of the piston is inclined is not made acute, this is advantageous in terms of thermal stress resistance.

Moreover, in accordance with the eighth aspect of the present invention, since fuel injected by the fuel injector collides with the cavity before the piston reaches top dead center, it is possible to make the collision of fuel with the cavity match the timing of the occurrence of squish flow, thereby confining effectively by means of the squish flow fuel that attempts to flow out to the exterior of the cavity.

Furthermore, in accordance with the ninth aspect of the present invention, even if the magnitude of reverse squish flow from the cavity to an outer peripheral part of the piston changes in the circumferential direction, since the first fuel injection angle becomes small in a direction in which the reverse squish flow is small so that fuel is injected to a position where the cavity is shallow, and the second fuel injection angle becomes large in a direction in which the reverse squish flow is large so that fuel is injected to a position where the cavity is deep, it is possible to make the conditions in which fuel and air are mixed uniform throughout the whole region of the cavity regardless of the size of the reverse squish flow.

Moreover, in accordance with the tenth aspect of the present invention, even if the magnitude of reverse squish flow from the cavity toward an outer peripheral part of the piston changes in the circumferential direction due to the squish area changing in the circumferential direction, since the first fuel injection angle becomes small in a direction in which the reverse squish flow is small (that is, a direction in which the squish area is small) so that fuel is injected to a position where the cavity is shallow, and the second fuel injection angle becomes large in a direction in which the reverse squish flow is large (that is, a direction in which the squish area is large) so that fuel is injected to a position where the cavity is deep, it is possible to make the conditions in which fuel and air are mixed uniform throughout the whole region of the cavity regardless of the size of the reverse squish flow.

Furthermore, in accordance with the eleventh aspect of the present invention, even if the magnitude of reverse squish flow from the cavity to an outer peripheral part of the piston changes in the circumferential direction due to the width of the squish area changing in the circumferential direction, since the first fuel injection angle becomes small in a direction in which the reverse squish flow is small (that is, a direction in which the width of the squish area is small) so that fuel is injected to a position where the cavity is shallow, and the second fuel injection angle becomes large in a direction in which the reverse squish flow is large (that is, a direction in which the width of squish area is large) so that fuel is injected to a position where the cavity is deep, it is possible to make the conditions in which fuel and air are mixed uniform throughout the whole region of the cavity regardless of the size of the reverse squish flow.

Moreover, in accordance with the twelfth aspect of the present invention, even if the magnitude of reverse squish flow from the cavity to an outer peripheral part of the piston changes in the circumferential direction due to the ridge length of the squish area changing in the circumferential direction, since the first fuel injection angle becomes small in a direction in which the reverse squish flow is small (that is, in a direction in which the ridge length of the squish area is small) so that fuel is injected to a position where the cavity is shallow, and the second fuel injection angle becomes large in a direction in which the reverse squish flow is large (that is, in a direction in which the ridge length of the squish area is large) so that fuel is injected to a position where the cavity is deep, it is possible to make the conditions in which fuel and air are mixed uniform throughout the whole region of the cavity regardless of the size of the reverse squish flow.

Furthermore, in accordance with the thirteenth aspect of the present invention, even if the magnitude of reverse squish flow from the cavity toward an outer peripheral part of the piston changes in the circumferential direction due to the squish clearance changing in the circumferential direction, since the first fuel injection angle becomes small in a direction in which the reverse squish flow is small (that is, a direction in which the squish clearance is large) so that fuel is injected to a position where the cavity is shallow, and the second fuel injection angle becomes large in a direction in which the reverse squish flow is large (that is, a direction in which the squish clearance is small) so that fuel is injected to a position where the cavity is deep, it is possible to make the conditions in which fuel and air are mixed uniform throughout the whole region of the cavity regardless of the size of the reverse squish flow.

Moreover, in accordance with the fourteenth aspect of the present invention, when fuel is injected along a plurality of fuel injection axes from the fuel injector disposed on the piston central axis within the cavity recessed in a central part of the piston whose top face height changes in the circumferential direction, the cross section of the cavity that passes through the $n^{th}$ fuel injection axis is defined as the fuel injection cross section Sn, and since the cross-sectional shape of the cavity defined by first to third specific points An, Bn, and Cn on the fuel injection cross section Sn is set so as to be substantially equal for each fuel injection cross section Sn, it is possible to make the conditions in which fuel and air are mixed in fuel injection cross sections Sn uniform, thus increasing the engine output and reducing harmful exhaust substances. Furthermore, since the angle formed by the edge of the opening of the cavity in a portion where the top face of the piston is inclined is not made acute, this is advantageous in terms of thermal stress resistance.

EXPLANATION OF REFERENCE NUMERALS AND SYMBOLS

13 Piston
23 Fuel injector
25 Cavity
25c Bottom wall portion
C1 Squish clearance
C2 Squish clearance
Li1 First fuel injection axis
Li2 Second fuel injection axis
SA Squish area
W1 Width of squish area
W2 Width of squish area
α1 First collision angle
α2 Second collision angle
β1 First fuel injection angle
β2 Second fuel injection angle

BEST MODE FOR CARRYING OUT THE INVENTION

A first embodiment of the present invention is explained below by reference to FIG. 1 to FIG. 9.

Embodiment 1

Figure 1:
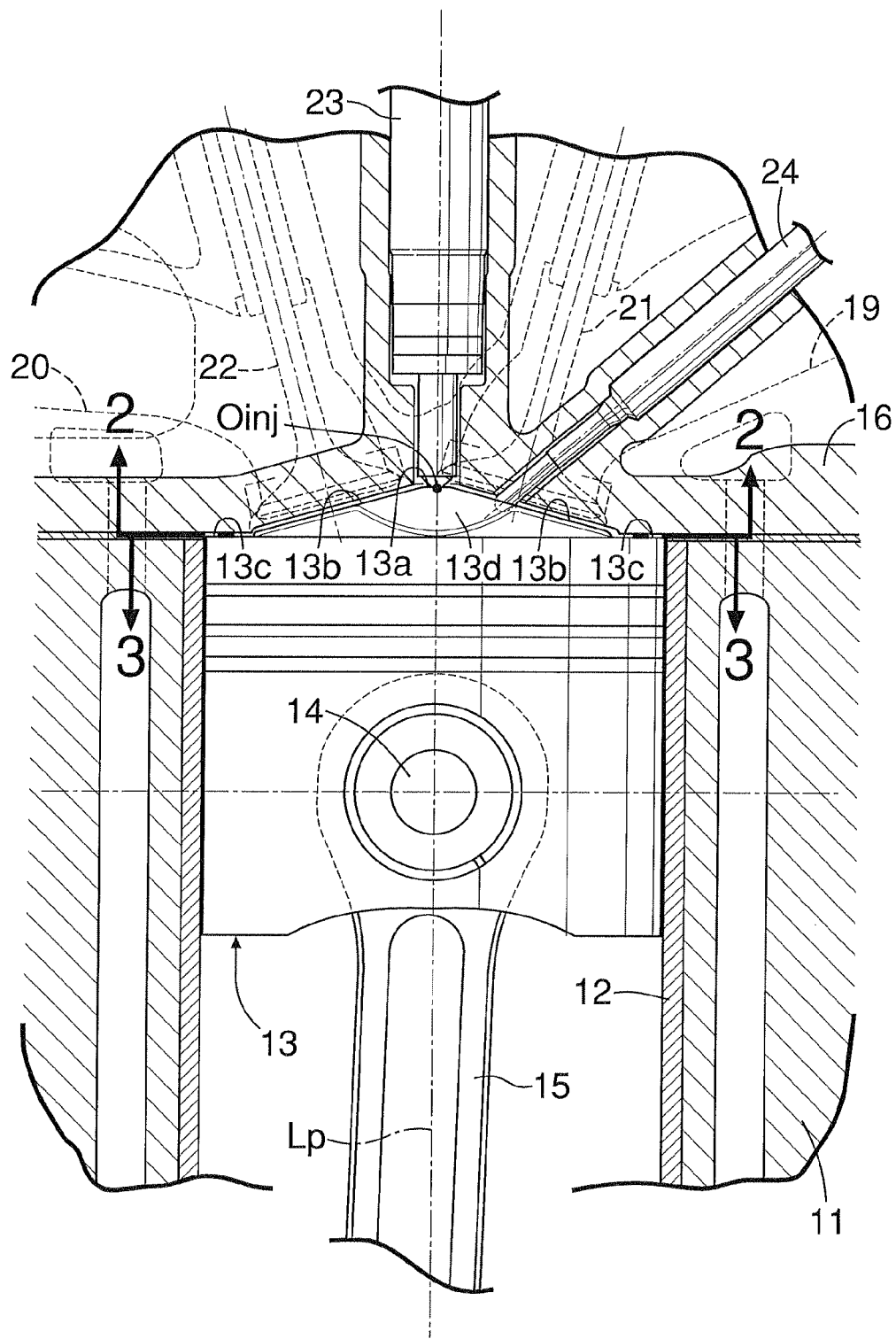
FIG. 1 is a vertical sectional view of a main part of a diesel engine. (first embodiment)
Figure 2:
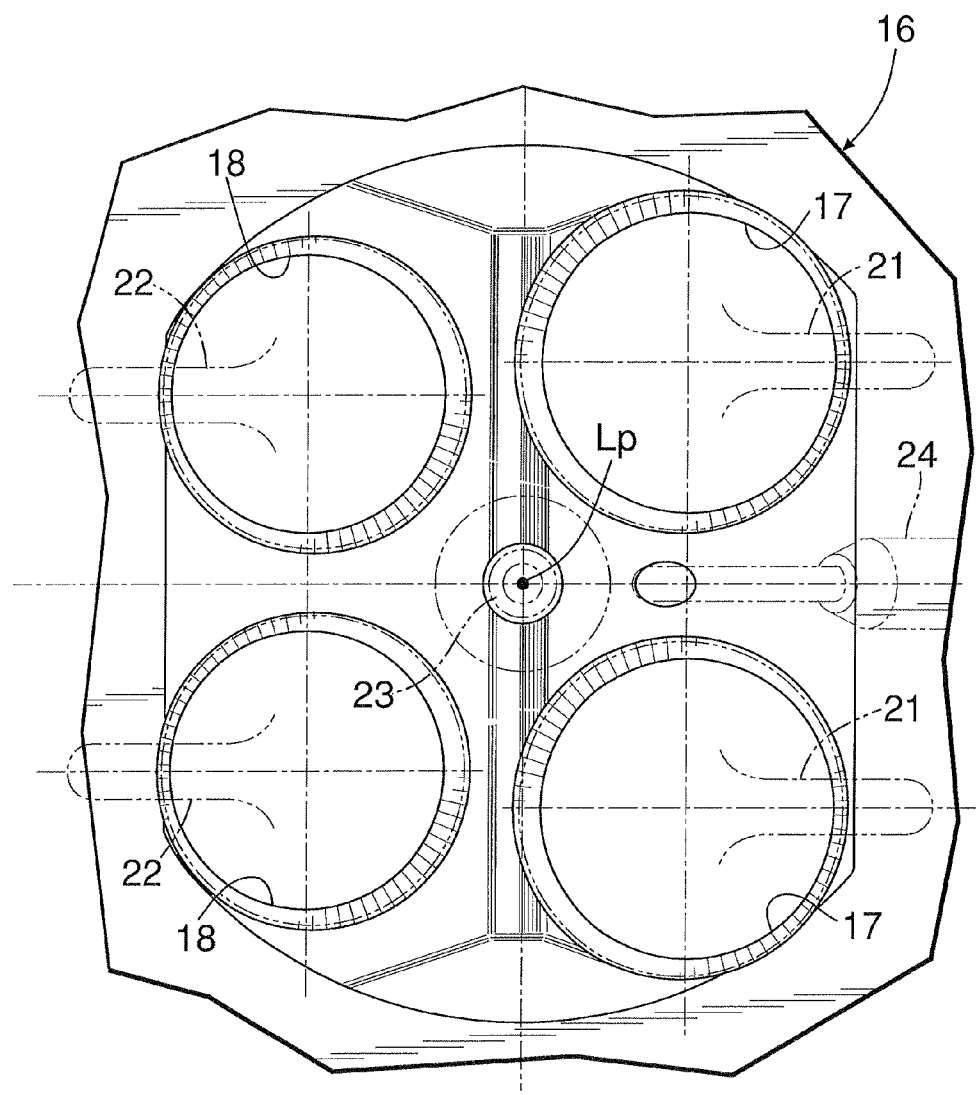
FIG. 2 is a view from arrowed line 2-2 in FIG. 1. (first embodiment)
Figure 3:
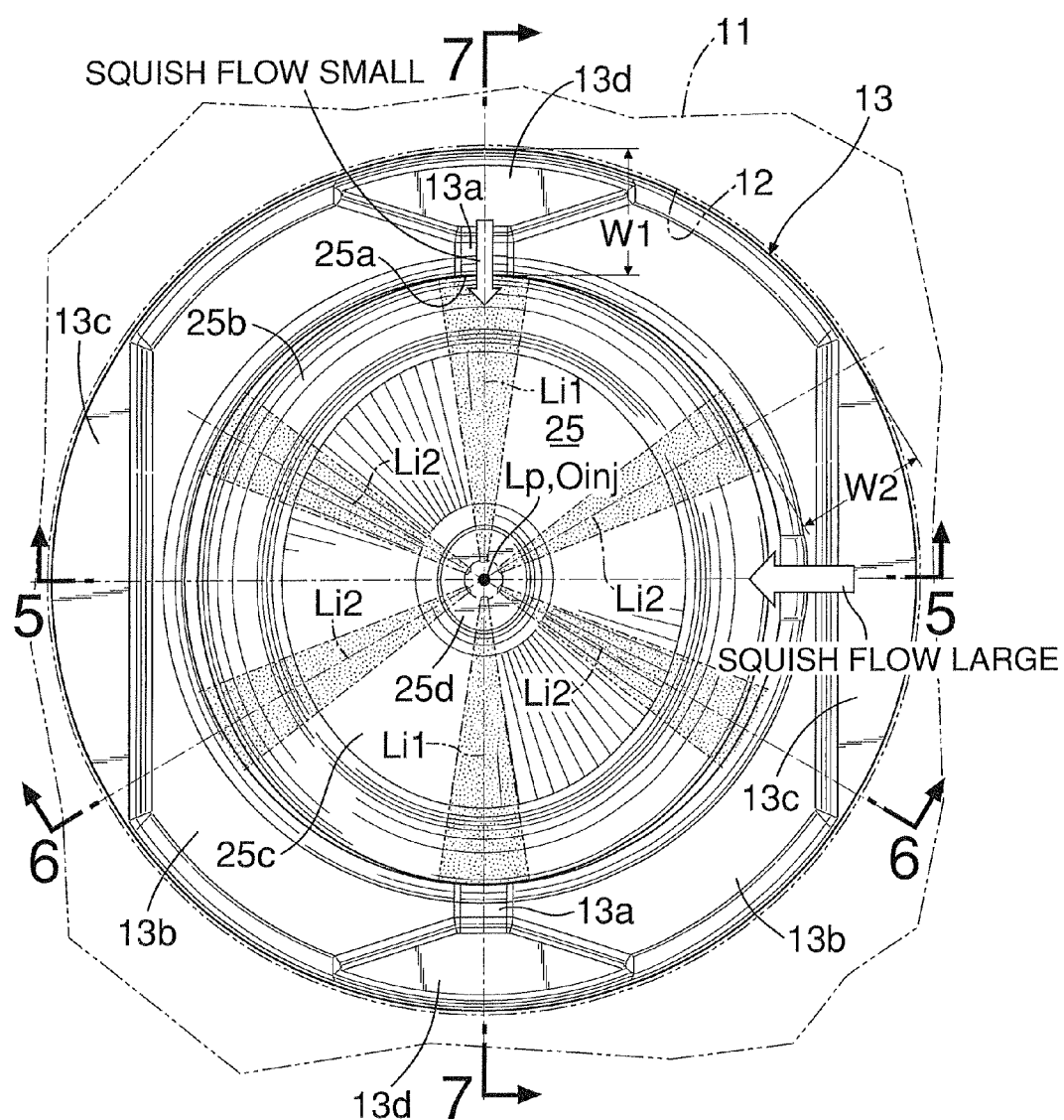
FIG. 3 is a view from arrowed line 3-3 in FIG. 1. (first embodiment)

As shown in FIG. 1 to FIG. 3, a direct fuel injection type diesel engine includes a piston 13 slidably fitted into a cylinder 12 formed in a cylinder block 11, and the piston 13 is connected to a crankshaft (not illustrated) via a piston pin 14 and a connecting rod 15. Two intake valve holes 17 and 17 and two exhaust valve holes 18 and 18 facing a top face of the piston 13 open in a lower face of a cylinder head 16, which is joined to an upper face of the cylinder block 11, an intake port 19 communicates with the intake valve holes 17 and 17, and an exhaust port 20 communicates with the exhaust valve holes 18 and 18. The intake valve holes 17 and 17 are opened and closed by intake valves 21 and 21, and the exhaust valve holes 18 and 18 are opened and closed by exhaust valves 22 and 22. A fuel injector 23 is provided so as to be positioned on a piston central axis Lp, and a glow plug 24 is provided so as to be adjacent to the fuel injector 23.

Figure 4:
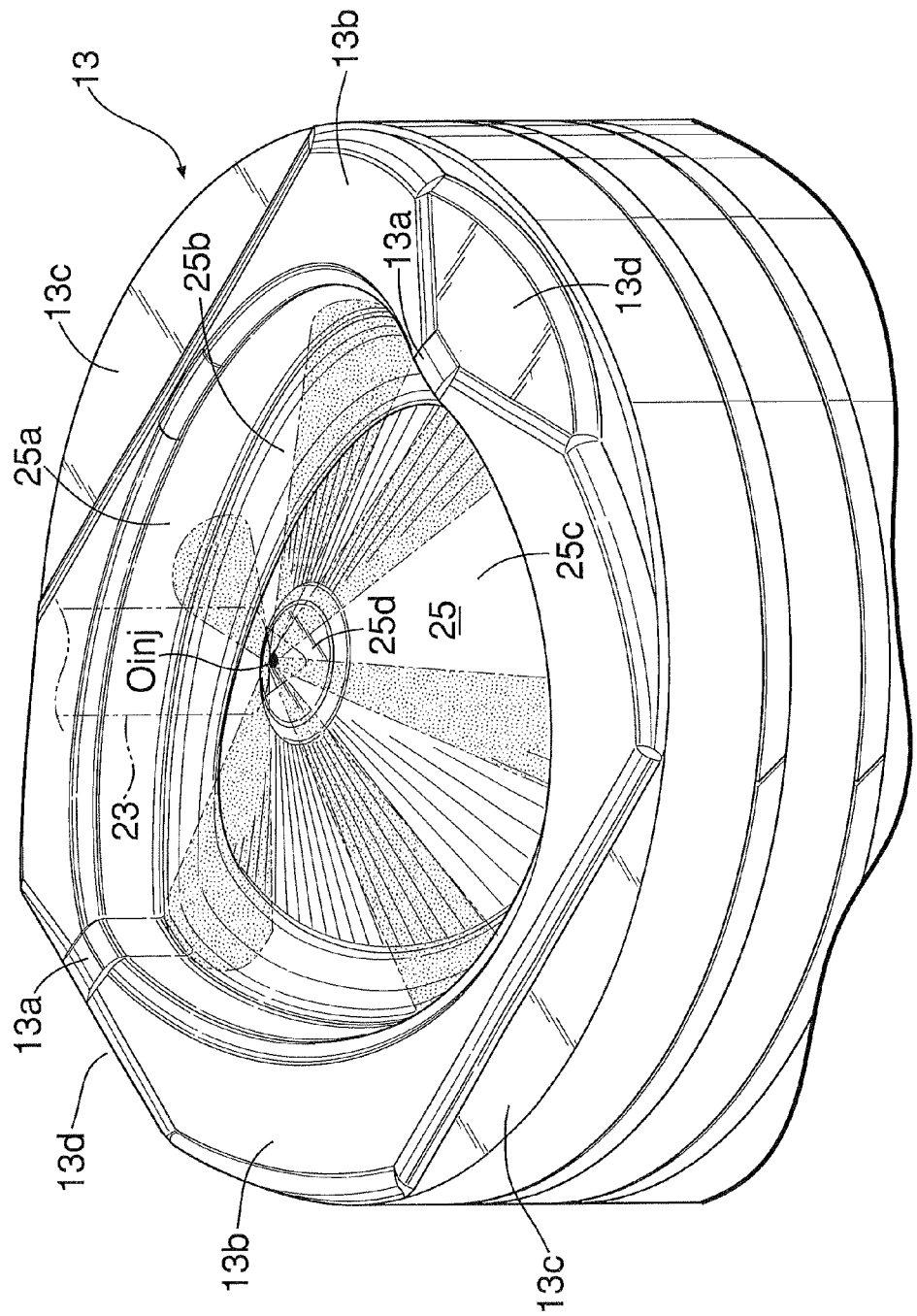
FIG. 4 is a perspective view of an upper part of a piston. (first embodiment)

As is clear from FIG. 1 and FIG. 4, the top face of the piston 13 and the lower face of the cylinder head 16 facing it are not flat but are inclined in a pentroof shape with a triangular cross section, and due to this shape it is possible to reduce the curvature of the intake port 19 and the exhaust port 20, guarantee a diameter for the intake valve holes 17 and 17 and the exhaust valve holes 18 and 18, and enhance the intake efficiency and the exhaust efficiency.

A cavity 25 with the piston central axis Lp as its center is recessed in the top face of the piston 13. Formed radially outside the cavity 25 are a pair of inclined faces 13b and 13b inclined downward to the intake side and the exhaust side from top portions 13a and 13a extending linearly parallel to the piston pin 14, a pair of flat faces 13c and 13c formed in the vicinity of the lower end of the inclined faces 13b and 13b so as to be perpendicular to the piston central axis Lp, and a pair of cutout portions 13d and 13d formed by cutting out opposite ends of the top portions 13a and 13a so as to be flat.

The fuel injector 23, which is disposed along the piston central axis Lp, injects fuel in six directions spaced at intervals of 60° in the circumferential direction with a fuel injection point Oinj, which is a virtual point on the piston central axis Lp, as the center. Among six fuel injection axes, two first fuel injection axes Li1 overlap the piston pin 14 when viewed in the piston central axis Lp direction, and the other four second fuel injection axes Li2 intersect the piston pin 14 direction at angles of 60°. Furthermore, when viewed in a direction perpendicular to the piston central axis Lp, the six first and second fuel injection axes Li1 and Li2 are inclined obliquely downward, the degree of downward inclination being small for the first fuel injection axes Li1 and large for the second fuel injection axes Li2 (see FIG. 6 and FIG. 7).

An injection point at which the fuel injector 23 actually injects fuel is slightly displaced radially outward from the piston central axis Lp, but the fuel injection point Oinj is defined as a point where the first and second fuel injection axes Li1 and Li2 intersect the piston central axis Lp.

Figure 5:
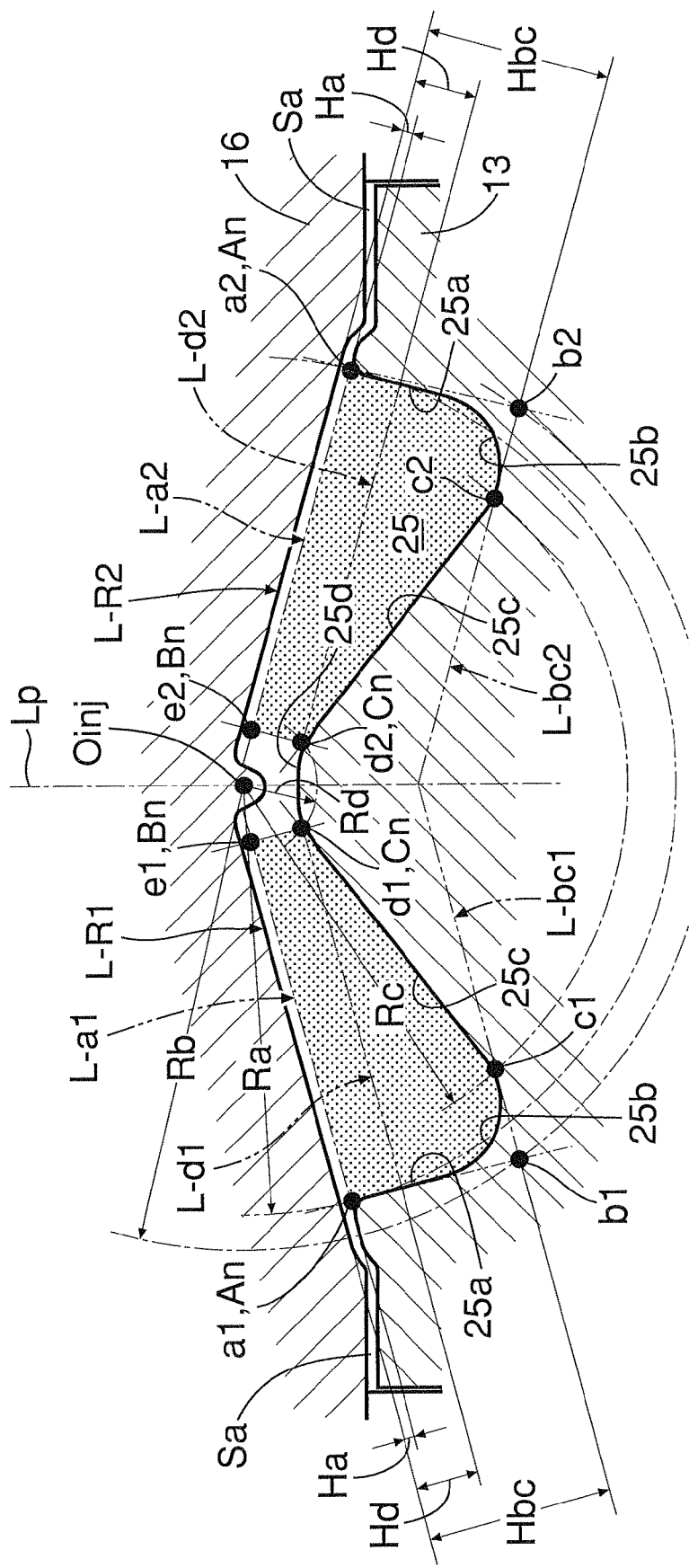
FIG. 5 is a sectional view along line 5-5 in FIG. 3. (first embodiment)

The cross-sectional shape of the cavity 25 is now explained in detail by reference to FIG. 5 to FIG. 7. FIG. 5 is a cross section in a direction perpendicular to the piston pin 14, FIG. 6 is a cross section in a direction that intersects the piston pin 14 at 60° (cross section containing second fuel injection axis Li2), and FIG. 7 is a cross section in a direction along the piston pin 14 (cross section containing first fuel injection axis Li1).

Figure 6:
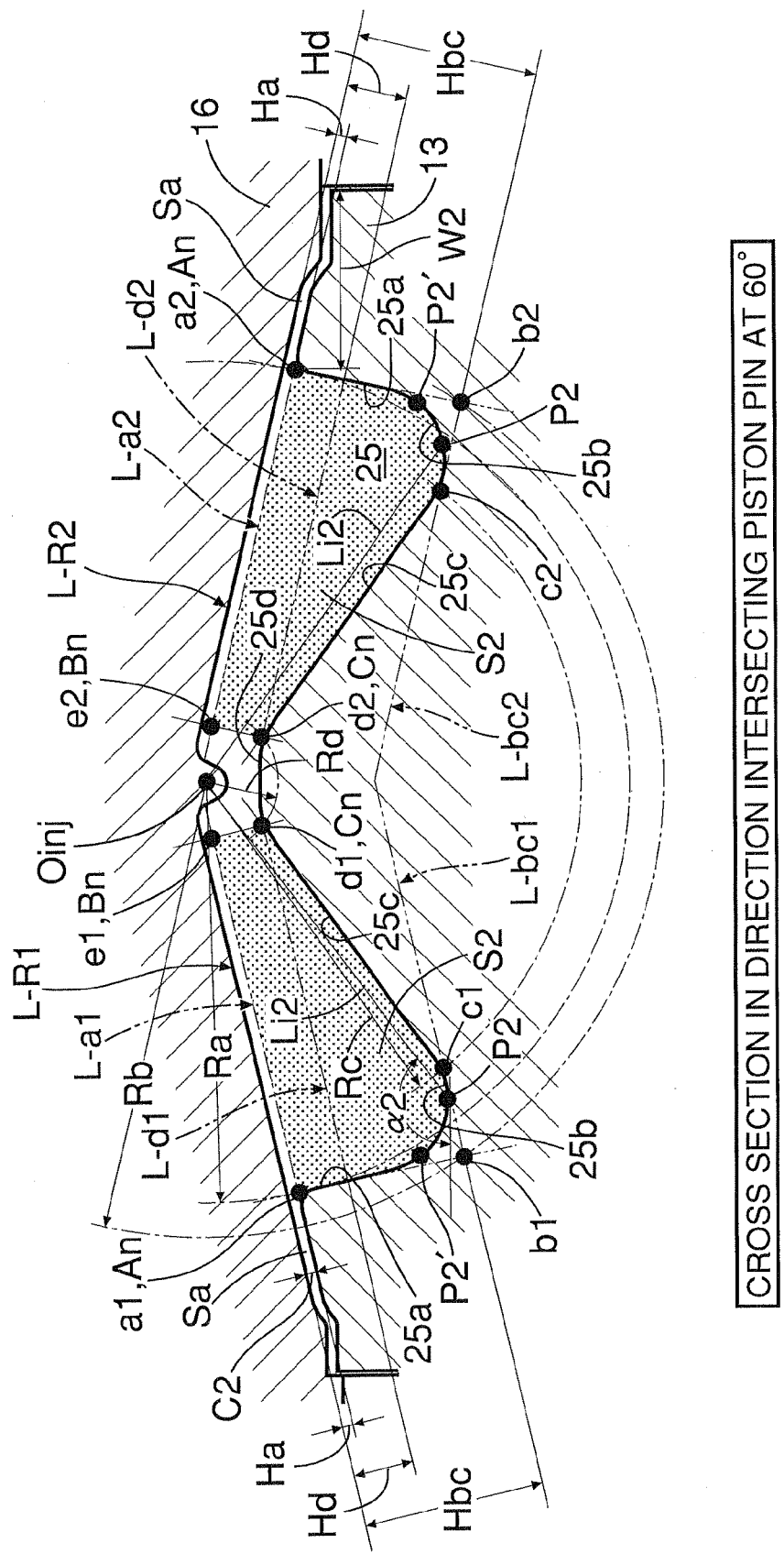
FIG. 6 is a sectional view along line 6-6 in FIG. 3. (first embodiment)
Figure 7:
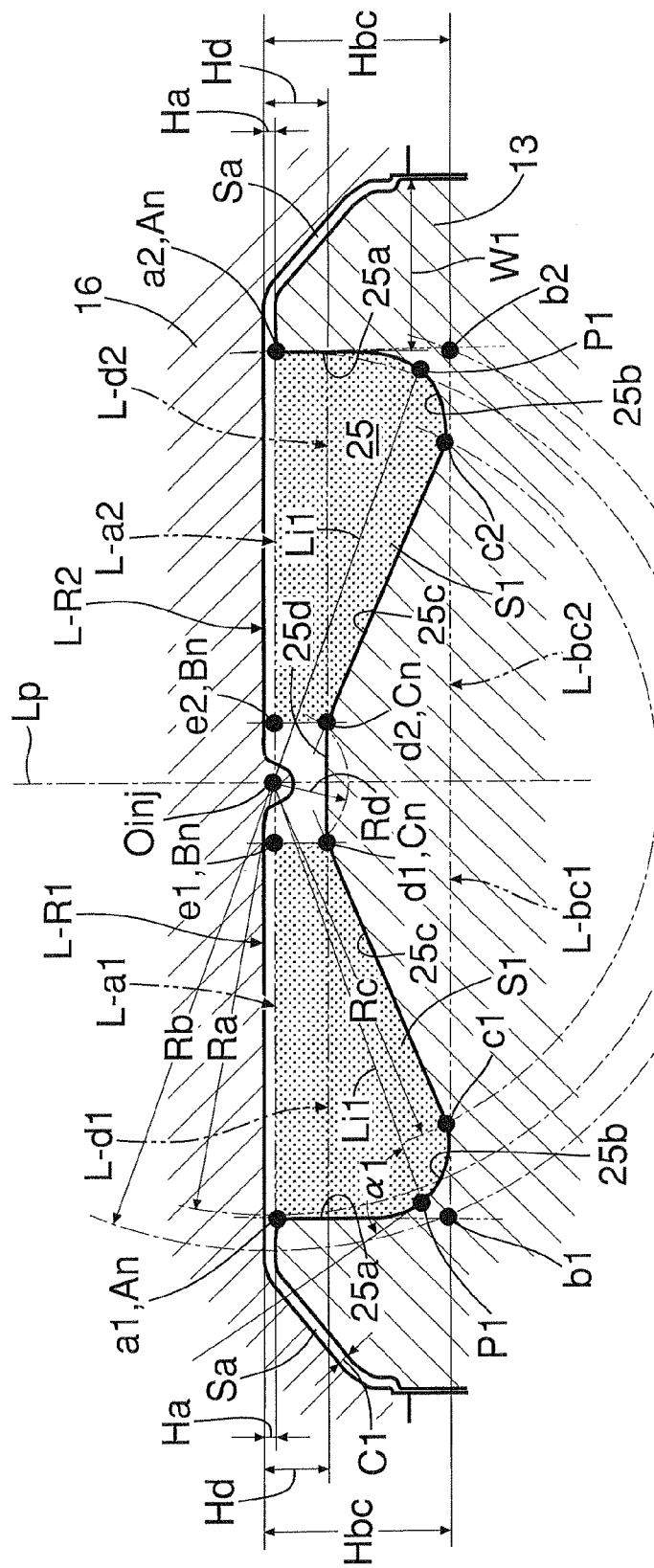
FIG. 7 is a sectional view along line 7-7 in FIG. 3. (first embodiment)

The important point here is that the cross sections of FIG. 5 to FIG. 7 are all cross sections in a direction that passes through the fuel injection point Oinj and is perpendicular to the top face of the piston 13. With regard to the cross section in the direction perpendicular to the piston pin 14 in FIG. 5 and the cross section in the direction of the piston pin 14 in FIG. 7, the section is perpendicular to the top face of the piston 13 and contains the piston central axis Lp. On the other hand, the cross section in a direction intersecting the piston pin 14 at 60° in FIG. 6 passes through the second fuel injection axis Li2 and is perpendicular to the top face of the piston 13 (that is, the inclined faces 13b and 13b), but does not contain the piston central axis Lp. That is, in FIG. 3, the section along line 5-5 and the section along line 7-7 are perpendicular to the plane of the paper, but the section along line 6-6 is not perpendicular to the plane of the paper and instead is perpendicular to the inclined faces 13b and 13b of the piston 13.

One aspect of the present embodiment is that the shape of the cavity 25 is substantially identical for any cross section that passes through the fuel injection point Oinj and that is perpendicular to the top face of the piston 13. The cross-sectional shape of the cavity 25 is divided into two, that is, left and right portions, sandwiching the fuel injection point Oinj; the two portions are substantially linearly connected in the cross section in the piston pin 14 direction in FIG. 7, but are connected in a peak shape in accordance with the pentroof shape of the piston 13 in the cross section in a direction perpendicular to the piston pin 14 in FIG. 5 and in the cross section in a direction that intersects the piston pin 14 at 60° in FIG. 6. However, essential parts of the cross-sectional shape of the cavity 25, that is, the shaded portions in FIG. 5 to FIG. 7, are completely identical.

As is clear from FIG. 5 to FIG. 7, the cavity 25 formed with the piston central axis Lp as the center is formed from a peripheral wall portion 25a extending linearly downward from the top face of the piston 13, a curved wall portion 25b curving in a concave shape from the lower end of the peripheral wall portion 25a toward the piston central axis Lp, a bottom wall portion 25c extending linearly obliquely upward from the radially inner end of the curved wall portion 25b toward the piston central axis Lp, and a top portion 25d connected to the radially inner end of the bottom wall portion 25c on the piston central axis Lp.

Lines extending parallel to and spaced only by a distance Ha downward from lines L-R1 and L-R2 denoting the lower face of the cylinder head 16 facing the cavity 25 are defined as piston top face baselines L-a1 and L-a2. Similarly, lines extending parallel to and spaced only by a distance Hbc downward from the lines L-R1 and L-R2 denoting the lower face of the cylinder head 16 are defined as cavity bottom face baselines L-bc1 and L-bc2, and lines extending parallel to and spaced only by a distance Hd downward from the lines L-R1 and L-R2 denoting the lower face of the cylinder head 16 are defined as cavity top portion baselines L-d1 and L-d2.

Intersection points of an arc having a radius Ra and the fuel injection point Oinj as the center with the piston top face baselines L-a1 and L-a2 are defined as a1 and a2. Similarly, intersection points of an arc having a radius Rb and the fuel injection point Oinj as the center with the cavity bottom face baselines L-bc1 and L-bc2 are defined as b1 and b2, intersection points of an arc having a radius Rc and the fuel injection point Oinj as the center with the cavity bottom face baselines L-bc1 and L-bc2 are defined as c1 and c2, and intersection points of an arc having a radius Rd and the fuel injection point Oinj as the center with the cavity top portion baselines L-d1 and L-d2 are defined as d1 and d2. Intersection points e1 and e2 are points at which perpendicular lines from the intersection points d1 and d2 to the piston top face baselines L-a1 and L-a2 intersect the piston top face baselines L-a1 and L-a2.

The peripheral wall portion 25a of the cavity 25 is on the straight lines a1b1 and a2b2, the bottom wall portion 25c of the cavity 25 coincides with the straight lines c1d1 and c2d2, and the curved wall portion 25b of the cavity 25 smoothly connects the straight lines a1b1 and a2b2 and the straight lines c1d1 and c2d2.

The shape of the cavity 25 is set so that the shaded cross-sectional shape defined by the intersection points a1, c1, d1, and e1 or the intersection points a2, c2, d2, and e2 is equal for any cross section that passes through the fuel injection point Oinj and is perpendicular to the top face of the piston 13.

The intersection points a1 and a2 correspond to a first specific point An of the present invention, the intersection points e1 and e2 correspond to a second specific point Bn of the present invention, and the intersection points d1 and d2 correspond to a third specific point Cn of the present invention.

With regard to the cross sections that pass through the first and second fuel injection axes Li1 and Li2 shown in FIG. 6 and FIG. 7, the shaded portion in the cross section (fuel injection cross section S1) in the piston pin 14 direction shown in FIG. 7 and the shaded portion in the cross section (fuel injection cross section S2) in a direction that intersects the piston pin 14 at 60° shown in FIG. 6 have the same shape.

In the cross section in the piston pin 14 direction shown in FIG. 7 a point at which the first fuel injection axis Li1 intersects a wall face of the cavity 25 is defined as a fuel collision point P1, and in the cross section in a direction that intersects the piston pin 14 at 60° shown in FIG. 6 a point at which the second fuel injection axis Li2 intersects the wall face of the cavity 25 is defined as a fuel collision point P2. The two fuel collision points P1 and P2 are present at different positions of the shaded fuel injection cross sections S1 and S2 having the same shape. That is, on the fuel injection cross sections S1 and S2 having the same shape, a position corresponding to the fuel collision point P1 is P2', and the actual fuel collision point P2 is at a lower position than that of P2' (a deeper position of the cavity 25). Therefore, compared with a fuel collision angle α1 formed by a tangent to the cavity 25 at the fuel collision point P1 and the first fuel injection axis Li1, a fuel collision angle α2 formed by a tangent to the cavity 25 at the fuel collision point P2 and the second fuel injection axis Li2 is larger. In the embodiment, both the first and second collision angles α1 and α2 are at least 90°, but the first collision angle α1 may be less than 90°, and the second collision angle α2 is desirably at least 90°.

The operation of the first embodiment of the present invention having the above-mentioned arrangement is now explained.

In accordance with the present embodiment, with regard to any cross section that passes through the fuel injection point Oinj and is perpendicular to the top face of the piston 13, the cross-sectional shapes of the cavity 25, excluding a very small part in the vicinity of the fuel injection point Oinj (region surrounded by intersection points e1, d1, d2, and e2), are formed so as to be the same. In particular, with regard to the two cross sections containing the first and second fuel injection axes Li1 and Li2 (see FIG. 6 and FIG. 7), since the cross-sectional shapes of the cavity 25 are formed so as to be the same, the conditions in which fuel and air are mixed in each portion of the cavity 25 are made uniform in the circumferential direction, thus improving the combustion conditions for the gas mixture, increasing the engine output, and reducing harmful exhaust substances.

Furthermore, in the cross sections in which the top face of the piston 13 is inclined as shown in FIG. 5 and FIG. 6, since the angle formed by the edge of the opening of the cavity 25 (portion at intersection point a2) is not made acute compared with a case in which the top face of the piston 13 is flat as shown in FIG. 7, it is possible to reduce the thermal load of this portion and improve the heat resistance.

Among cross sections of the cavity 25 that pass through the fuel injection point Oinj, the cross section that has a large effect on the mixing of fuel and air is not a cross section that contains the piston central axis Lp but a cross section that is perpendicular to the top face of the piston 13. This is because diffusion of fine fuel particles in the circumferential direction within the cavity 25 occurs in a direction along the top face of the piston 13, and the cross section perpendicular to the diffusion direction is a cross section perpendicular to the top face of the piston 13. In this embodiment, making the shape of the cavity 25 substantially identical in any cross section that passes through the fuel injection point Oinj and is perpendicular to the top face of the piston 13 enables the conditions in which fuel and air are mixed in each portion of the cavity 25 to be made yet more uniform.

Furthermore, since the intersection points d1 and d2 are positioned on the boundary between the bottom wall portion 25c and the top portion 25d of the cavity 25, the intersection points d1 and d2 and the intersection points e1 and e2 are made as close to the piston central axis Lp as possible, the proportion of the shaded cross-sectional shape occupying each fuel injection cross section Sn is increased, and variation of the conditions in which fuel and air are mixed in each cross section in the circumferential direction of the cavity 25 can be minimized.

Figure 8:
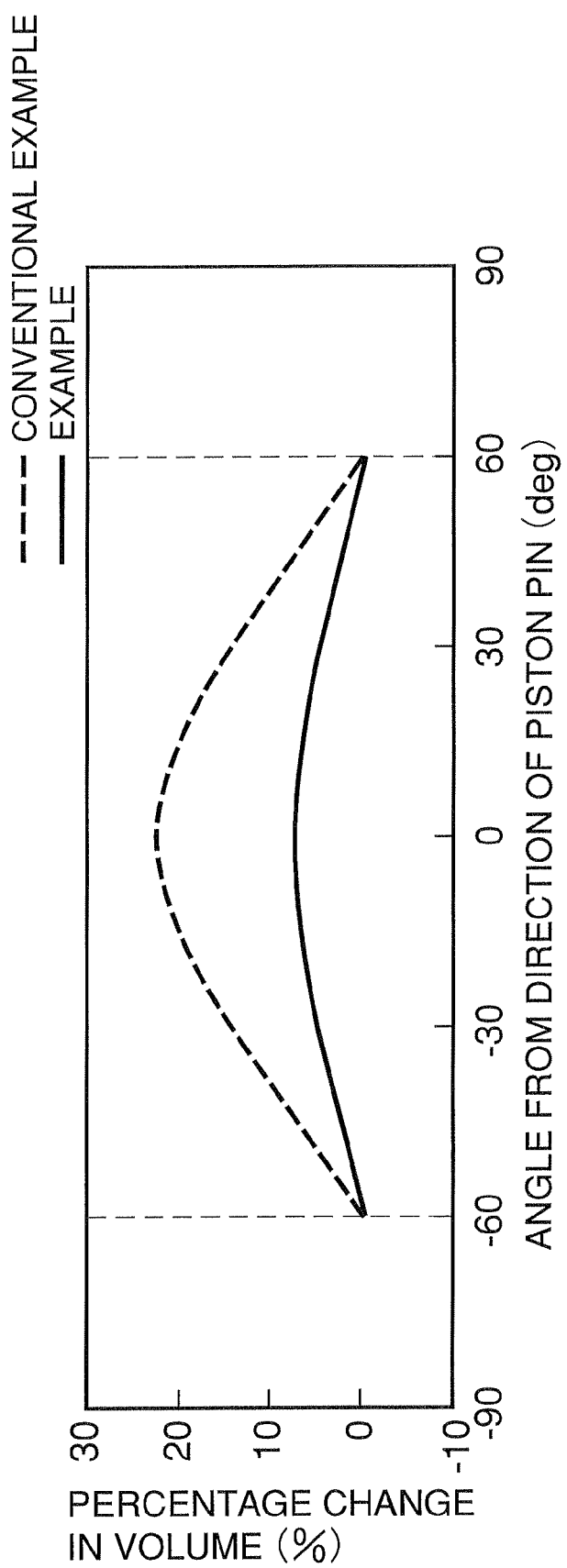
FIG. 8 is a graph showing percentage change in cavity volume in a range of 30° to the left and the right of a fuel injection axis when the direction of the fuel injection axis is changed in the circumferential direction. (first embodiment)

FIG. 8 shows the percentage change in volume of the cavity 25 in a range of 30° to both left and the right of the fuel injection axis when the direction of the fuel injection axis is moved in a range of 60° to both left and right of the piston central axis Lp with the piston pin 14 direction as a reference (0°). The solid line corresponds to the present embodiment in which the cross-sectional shape of the cavity 25 is identical for any cross section that passes through the fuel injection point Oinj and is perpendicular to the top face of the piston 13, and the broken line corresponds to the conventional example (the invention described in Patent Publication 1 above). As is clear from the drawing, it can be seen that the percentage change in volume exceeds 20% in the conventional example, but in the present embodiment the percentage change in volume is suppressed to less than 10%.

In the invention of the present application, the shape of the cavity 25 is made substantially identical for any cross section that passes through the fuel injection point Oinj and is perpendicular to the top face of the piston 13, but the shape of the cavity 25 being substantially identical referred to here is defined as including a slight change in shape such that the above-mentioned percentage change in volume is less than 10%, for example, a case in which the fuel injection cross section Sn passes through the piston central axis Lp, or a case in which the fuel injection cross section Sn is slightly inclined from the state in which it is perpendicular to the top face of the piston 13.

When the piston 13 approaches top dead center in the compression stroke, since the volume of an annular squish area SA (see FIG. 5 to FIG. 7) formed between the top face surrounding the cavity 25 of the piston 13 and the lower face of the cylinder head 16 decreases, a radially inward squish flow from the squish area SA toward the cavity 25 is generated. In the present embodiment, since the piston 13 has a pentroof-shaped top face, the magnitude of the squish flow becomes nonuniform in the circumferential direction.

The magnitude of the squish flow depends on the shape of the squish area SA; in the present embodiment the squish flow is smallest in a cross section in a direction along the piston pin 14 (see FIG. 7), and the squish flow is largest in a cross section in a direction perpendicular to the piston pin 14 (see FIG. 5). Therefore, the squish flow in a cross section in a direction that includes the second fuel injection axis Li2 and intersects the piston pin 14 at 60° (see FIG. 6) is larger than the squish flow in a cross section that includes the first fuel injection axis Li1 and is along the piston pin 14 (see FIG. 7).

The reason therefor is that, since the shape of the cavity 25 when viewed in the piston central line Lp direction becomes an elliptical shape with its major axis coinciding with the direction of the piston pin 14 as is clear from FIG. 3, a width W1 of the squish area SA becomes small in a cross section in a direction along the piston pin 14, and a width W2 of the squish area SA becomes large in a cross section in a direction intersecting the piston pin 14 at 60°.

In this way, the magnitude of the squish flow basically depends on the widths W1 and W2 in the radial direction of the squish area SA, but it can be said that it similarly depends on the ridge length in the radial direction of the squish area SA. The ridge length in the radial direction of the squish area SA is the length of a polyline that is bent along the squish area SA shown as a cross section; the shorter the ridge length the smaller the squish flow, and the longer the ridge length the larger the squish flow.

Furthermore, the magnitude of the squish flow also depends on the squish clearance, which is the thickness of the squish area SA when the piston 13 is at top dead center; the smaller the squish clearance the larger the squish flow, and the larger the squish clearance the smaller the squish flow. In the present embodiment, in a cross section in a direction along the piston pin 14 (see FIG. 7) the squish clearance C1 is large and the squish flow is small, and in a cross section in a direction intersecting the piston pin 14 at 60° (see FIG. 6) the squish clearance C2 is small and the squish flow is large.

As explained above, when the magnitude of the squish flow becomes nonuniform in the circumferential direction according to the shape of the squish area SA, even if the fuel injector 23 injects fuel uniformly in the interior of the cavity 25, in a portion where the squish flow is large fuel is confined in a bottom part of the cavity 25 and does not diffuse uniformly, whereas in a portion where the squish flow is small fuel flows out to the exterior of the cavity 25, and even if the cross-sectional shape of the cavity 25 is formed so as to be the same for any cross section that passes through the fuel injection point Oinj and is perpendicular to the top face of the piston 13, the advantage of this cannot be exploited fully, and there is a possibility that the combustion conditions for the gas mixture will degrade, harmful exhaust materials will increase, or soot will be formed.

However, in accordance with the present embodiment, since the first collision angle α1 is small (close to a right angle) in the cross section where the squish flow is small, that is, the cross section that contains the first fuel injection axis Li1 and is along the piston pin 14 (see FIG. 7), fuel that has collided with the cavity 25 rebounds from a wall face of the cavity 25, and a tendency for fuel to run up toward the opening side along the wall face of the cavity 25 weakens. Even if the squish flow is small, it is possible to diffuse fuel uniformly in the interior of the cavity 25 while preventing fuel from flowing out to the exterior via the opening of the cavity 25.

Furthermore, since the second collision angle α2 is large (obtuse) in a cross section where the squish flow is large, that is, a cross section in a direction that contains the second fuel injection axis Li2 and intersects the piston pin 14 at 60° (see FIG. 6), fuel that has collided with the cavity 25 does not rebound from the wall face of the cavity 25, and the tendency for fuel to run up toward the opening side along the wall face of the cavity 25 strengthens. Even if the squish flow is large, it is possible to diffuse fuel uniformly in the interior of the cavity 25 while preventing fuel from flowing out to the exterior via the opening of the cavity 25.

As hereinbefore described, making the first and second collision angles α1 and α2 at the fuel collision points P1 and P2 where the first and second fuel injection axes Li1 and Li2 intersect the wall face of the cavity 25 different from each other allows the tendency for fuel that has collided with the cavity 25 to run up toward the opening along the wall face of the cavity 25 and the tendency for fuel to be confined within the cavity 25 by the squish flow to be counterbalanced, allows the fuel to be uniformly diffused throughout the region within the cavity 25 to thus prevent it from flowing out to the exterior, and improves the combustion conditions for the gas mixture to thus suppress formation of harmful exhaust materials and soot.

Figure 9:
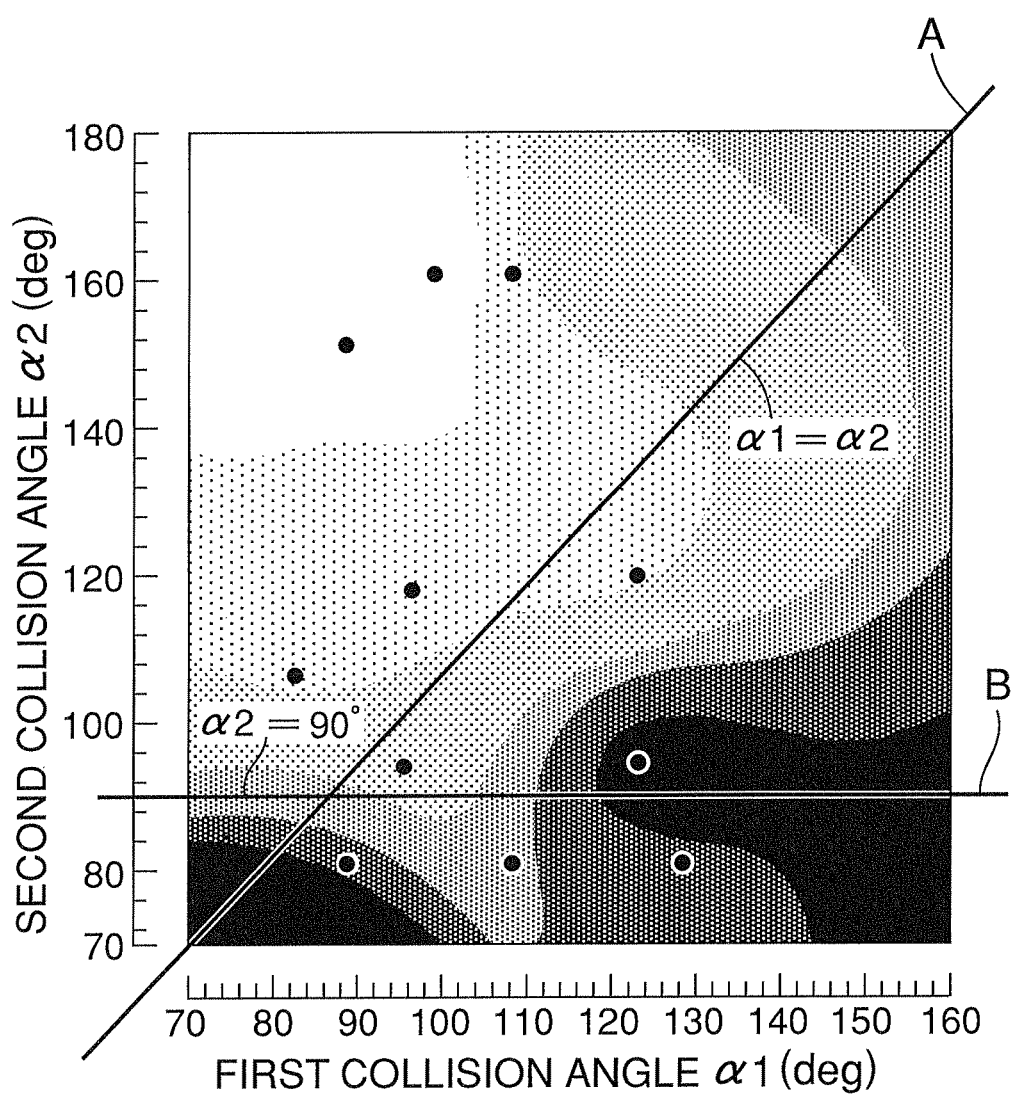
FIG. 9 is a view showing change in amount of soot formed with respect to first and second collision angles. (first embodiment)

FIG. 9 is a diagram showing changes in the amount of soot formed with respect to the first and second collision angles α1 and α2; the abscissa denotes the first collision angle α1, the ordinate denotes the second collision angle α2, and a dark colored area indicates that the amount of soot formed is large. A straight line A that passes through the origin and rises to the right corresponds to first collision angle α1=second collision angle α2, and it can be seen that the amount of soot formed decreases in a region above the straight line A, that is, a region in which second collision angle α2>first collision angle α1. Furthermore, a straight line B corresponds to second collision angle α2=90°, and it can be seen that the amount of soot formed decreases particularly markedly in a region that is above the straight line A and above the straight line B, that is, second collision angle α2>first collision angle α1 and second collision angle α2≧90°.

Since squish flow occurs before the piston 13 reaches top dead center of the compression stroke, the timing with which fuel injected by the fuel injector 23 collides with the cavity 25 is desirably before top dead center. In an arrangement in which fuel injection is carried out a plurality of times per cycle, the timing with which fuel of a main injection in which the largest amount of fuel is injected collides with the cavity may be set before top dead center.

A second embodiment of the present invention is now explained by reference to FIG. FIG. 10 to FIG. 12.

Embodiment 2

Figure 11:
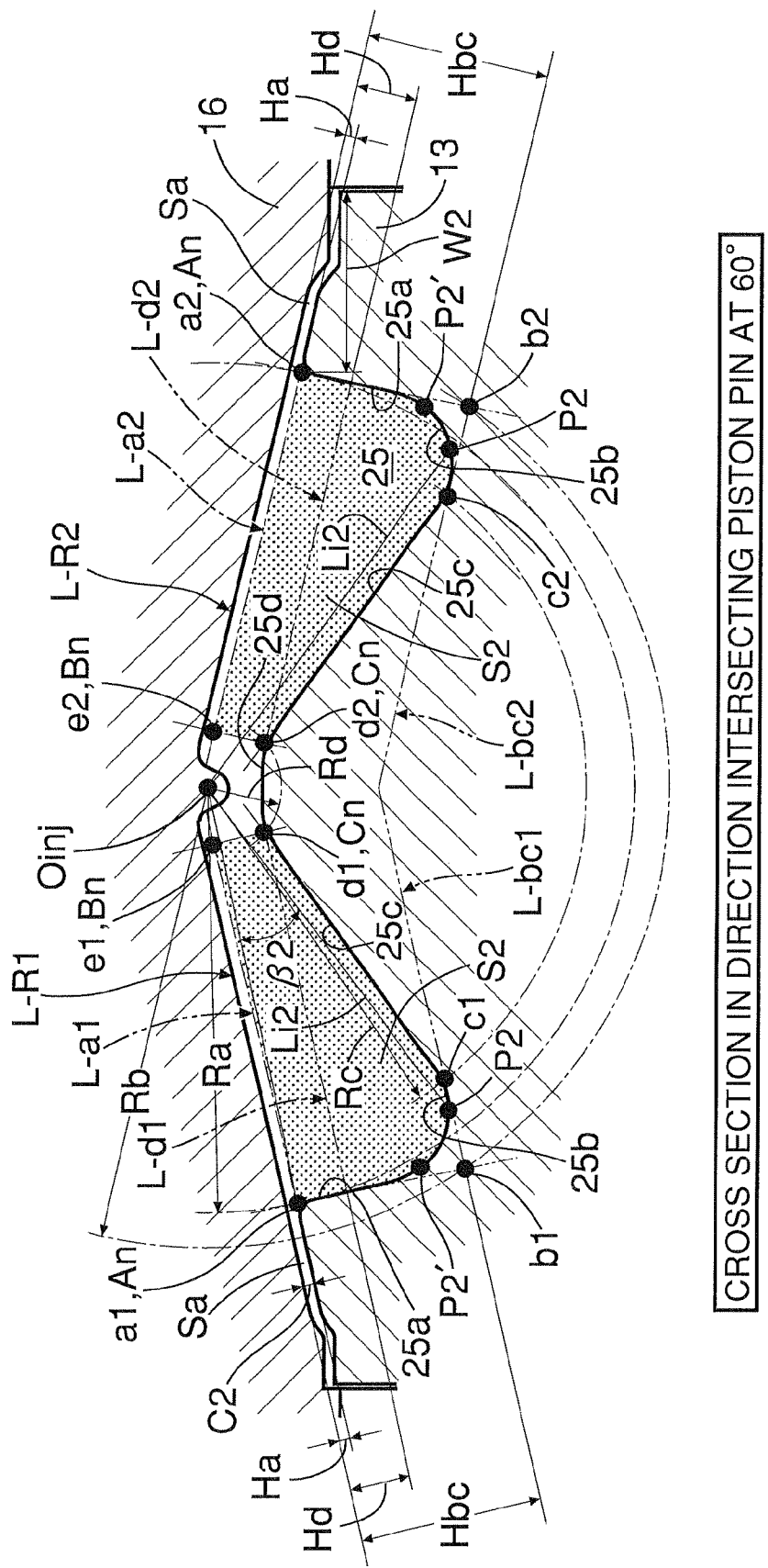
FIG. 11 is a sectional view along line 11-11 in FIG. 10. (second embodiment)
Figure 12:
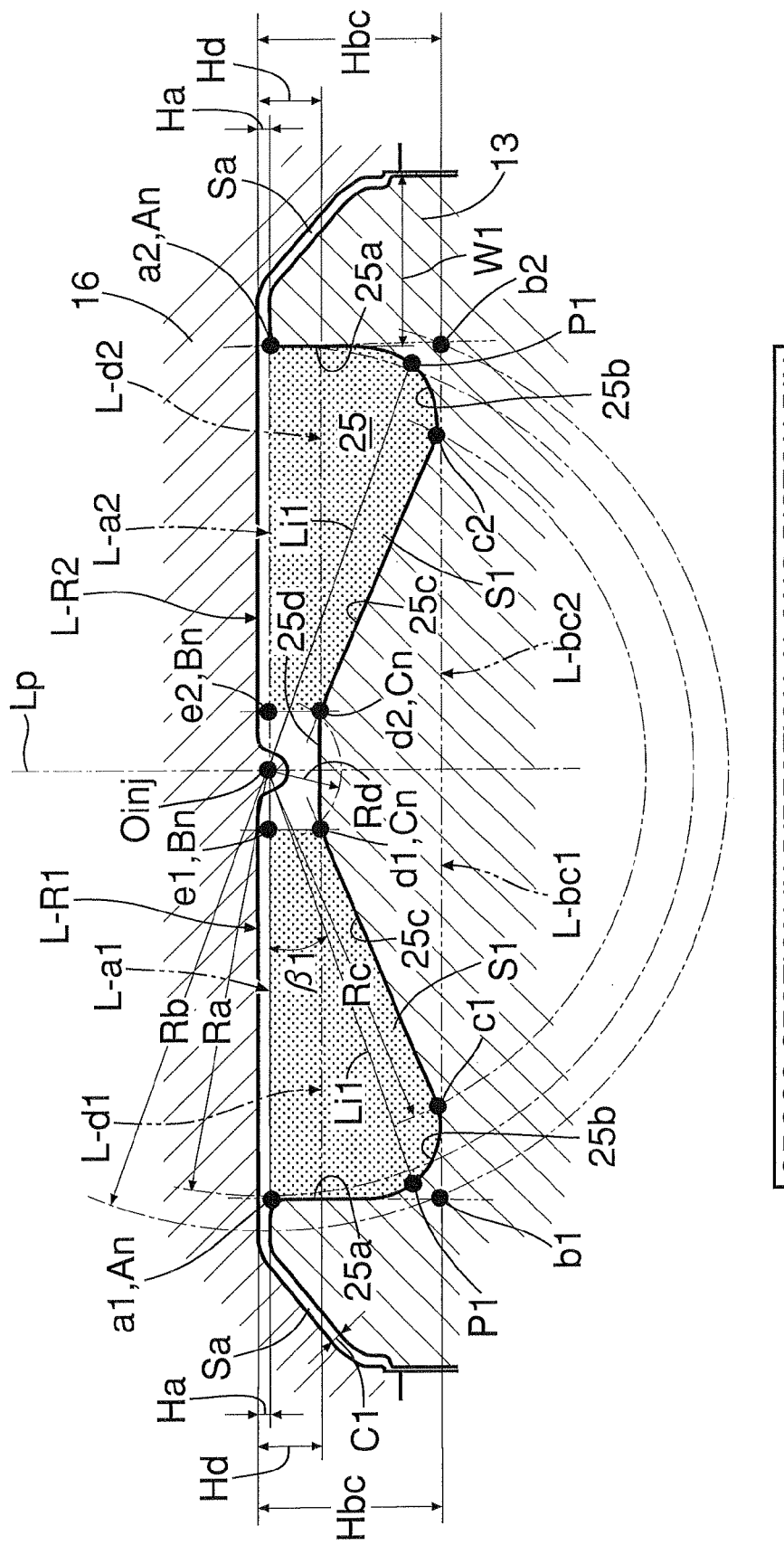
FIG. 12 is a sectional view along line 12-12 in FIG. 10. (second embodiment)

In a cross section in the direction of a piston pin 14 shown in FIG. 12, a point where a first fuel injection axis Li1 intersects a wall face of a cavity 25 is defined as a fuel collision point P1, and in a cross section in a direction that intersects the piston pin 14 at 60° shown in FIG. 11, a point where a second fuel injection axis Li2 intersects the wall face of the cavity 25 is defined as a fuel collision point P2. The two fuel collision points P1 and P2 are present at different positions on shaded fuel injection cross sections S1 and S2 having the same shape. That is, in the identically shaped fuel injection cross sections S1 and S2 a position corresponding to the fuel collision point P1 is P2', but the actual fuel collision point P2 is present at a position lower than P2' (a deeper position in the cavity 25). Therefore, compared with a first fuel injection angle β1 formed by the first fuel injection axis Li1 with respect to a straight line connecting a fuel injection point Oinj and a first specific point An defining the open end of the cavity 25, a second fuel injection angle β2 formed by the second fuel injection axis Li2 becomes larger. In other words, in the direction of the piston pin 14 shown in FIG. 12, the first fuel injection axis Li1 is oriented toward a shallow position of the cavity 25 (a position close to the open end), and in a direction that intersects the piston pin 14 at 60° shown in FIG. 11 the second fuel injection axis Li2 is oriented toward a deep position of the cavity 25 (a position close to a bottom wall).

The operation of the second embodiment of the present invention having the above-mentioned arrangement is now explained.

When a piston 13 approaches top dead center during a compression stroke, the volume of an annular squish area SA formed between a top face surrounding the cavity 25 of the piston 13 and a lower face of a cylinder head 16 (see FIG. 11 and FIG. 12) decreases, thereby forming a radially inward squish flow from the squish area SA toward the cavity 25. Furthermore, when the piston 13 starts to descend from top dead center, the volume of the squish area SA increases, thereby forming a radially outward reverse squish flow from the cavity 25 toward the squish area SA. In each position in the circumferential direction of the piston 13, the squish flow and the reverse squish flow have opposite directions but substantially the same magnitude, and in the present embodiment since the piston 13 has a pentroof-shaped top face, the magnitude of the squish flow and the magnitude of the reverse squish flow are nonuniform in the circumferential direction.

The magnitude of the reverse squish flow depends on the shape of the squish area SA, and in the present embodiment the reverse squish flow is smallest in a cross section in a direction along the piston pin 14 (see FIG. 12), and the reverse squish flow is largest in a cross section in a direction perpendicular to the piston pin 14 (see FIG. 5). Therefore, the reverse squish flow in a cross section in a direction that includes the second fuel injection axis Li2 and intersects the piston pin 14 at 60° (see FIG. 11) is larger than the reverse squish flow in a cross section that includes the first fuel injection axis Li1 and is along the piston pin 14 (see FIG. 12).

Figure 10:
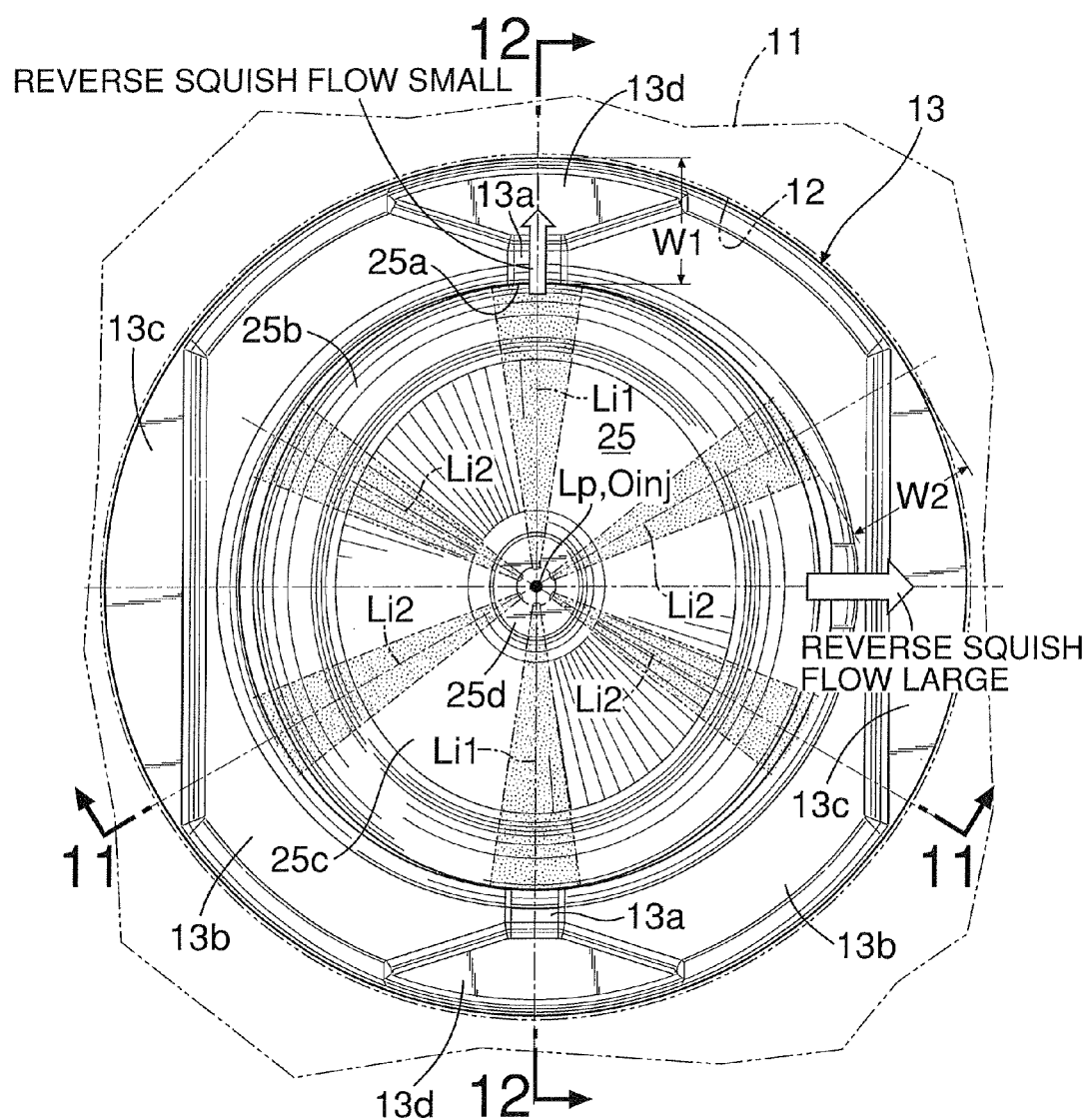
FIG. 10 is a view corresponding to FIG. 3. (second embodiment)

The reason therefor is that, since the shape of the cavity 25 when viewed in the direction of the piston central line Lp is an elliptical shape with its major axis coinciding with the direction of the piston pin 14 as is clear from FIG. 10, in a cross section in a direction along the piston pin 14 the width W1 of the squish area SA is small, and in a cross section in a direction intersecting the piston pin 14 at 60° the width W2 of the squish area SA is large.

In this way, the magnitude of the reverse squish flow basically depends on the widths W1 and W2 in the radial direction of the squish area SA, but it can also be said to depend on the ridge length in the radial direction of the squish area SA. The ridge length in the radial direction of the squish area SA is the length of a polyline that is bent along the squish area SA shown as a cross section; the shorter the ridge length the smaller the reverse squish flow, and the longer the ridge length the larger the reverse squish flow.

Furthermore, the magnitude of the reverse squish flow also depends on the squish clearance, which is the thickness of the squish area SA when the piston 13 is at top dead center; when the squish clearance is small the reverse squish flow is large, and when the squish clearance is large the reverse squish flow is small. In the present embodiment, in a cross section in a direction along the piston pin 14 (see FIG. 12) a squish clearance C1 is large and the reverse squish flow is small, and in a cross section in a direction intersecting the piston pin 14 at 60° (see FIG. 11) a squish clearance C2 is small and the reverse squish flow is large.

As hereinbefore explained, when the magnitude of the reverse squish flow is nonuniform in the circumferential direction according to the shape of the squish area SA, even if the fuel injector 23 injects fuel uniformly in the interior of the cavity 25, in a portion where the reverse squish flow is large fuel is sucked out via the open end of the cavity 25, whereas in a portion where the reverse squish flow is small fuel remains in a bottom portion of the cavity 25, and even if the cross-sectional shape of the cavity 25 is formed so as to be the same for any cross section that passes through the fuel injection point Oinj and is perpendicular to the top face of the piston 13, the advantage of this cannot be fully exploited, and there is a possibility that the combustion conditions for the gas mixture will degrade, harmful exhaust materials will increase, or soot will be formed.

However, in accordance with the present embodiment, even if the first fuel injection angle β1 in the cross section where the reverse squish flow is small, that is, the cross section that contains the first fuel injection axis Li1 and is along the piston pin 14 (see FIG. 12) is made small, and fuel is injected to a shallow position of the cavity 25, since the reverse squish flow is small, fuel does not flow out to the exterior of the cavity 25, and fuel can be diffused uniformly in the interior of the cavity 25.

Furthermore, even if the second fuel injection angle β2 in the cross section where the reverse squish flow is large, that is, the cross section in a direction that contains the second fuel injection axis Lit and intersects the piston pin 14 at 60° (see FIG. 11) is made large, and fuel is injected to a deep position of the cavity 25, since the reverse squish flow is large, fuel does not remain in the bottom portion of the cavity 25, and fuel can be diffused uniformly in the interior of the cavity 25.

As hereinbefore described, making the first and second fuel injection angles β1 and β2 different from each other allows a tendency for injected fuel to remain in the bottom portion of the cavity 25 and a tendency for fuel to be sucked out from the cavity 25 by reverse squish flow to be counterbalanced, allows the fuel to be uniformly diffused throughout the whole region within the cavity 25 to thus prevent it from flowing out to the exterior, and improves the combustion conditions for the gas mixture to thus suppress formation of harmful exhaust materials and soot.

Embodiments of the present invention are explained above, but the present invention may be modified in a variety of ways as long as the modifications do not depart from the spirit and scope thereof.

For example, the cavity 25 of the embodiments is formed so as to have the same cross-sectional shape for any cross section that passes through the fuel injection point Oinj and is perpendicular to the top face of the piston 13, but the present invention may also be applied to an arrangement in which the cross-sectional shape is not formed so as to be the same.

Furthermore, in the embodiments the fuel injector 23 injects fuel in six directions spaced at intervals of 60°, but the direction of injection of fuel is not limited to the six directions.

Moreover, in the embodiments, an explanation is given for a direct fuel-injection diesel engine, but the present invention is not limited to a diesel engine and may be applied to another direct fuel-injection engine.

The invention claimed is:

1. A direct fuel-injection engine comprising a piston (13) having a top face with a height that varies in the circumferential direction, a cavity (25) recessed in a central part of the piston (13), and a fuel injector (23) for injecting fuel along a plurality of fuel injection axes (Li1, Li2) oriented in a plurality of directions spaced in the circumferential direction within the cavity (25), characterized in that the magnitude of squish flow changes in the circumferential direction, and a second collision angle ($\alpha 2$) at which a second fuel injection axis (Li2), oriented in a direction in which the squish flow is large, collides with the cavity (25) is set larger than a first collision angle ($\alpha 1$) at which a first fuel injection axis (Li1), oriented in a direction in which the squish flow is small, collides with the cavity (25).

2. A direct fuel-injection engine comprising a piston (13) having a top face with a height that varies in the circumferential direction, a cavity (25) recessed in a central part of the piston (13), and a fuel injector (23) for injecting fuel along a plurality of fuel injection axes (Li1, Li2) oriented in a plurality of directions spaced in the circumferential direction within the cavity (25), characterized in that a squish area (SA) changes in the circumferential direction, and a second collision angle ($\alpha 2$) at which a second fuel injection axis (Li2), oriented in a direction in which the squish area (SA) is large, collides with the cavity (25) is set larger than a first collision angle ($\alpha 1$) at which a first fuel injection axis (Li1), oriented in a direction in which the squish area (SA) is small, collides with the cavity (25).

3. A direct fuel-injection engine comprising a piston (13) having a top face with a height that varies in the circumferential direction, a cavity (25) recessed in a central part of the piston (13), and a fuel injector (23) for injecting fuel along a plurality of fuel injection axes (Li1, Li2) oriented in a plurality of directions spaced in the circumferential direction within the cavity (25), characterized in that a width (W1, W2) of a squish area (SA) changes in the circumferential direction, and a second collision angle ($\alpha 2$) at which a second fuel injection axis (Li2), oriented in a direction in which the width (W2) is large, collides with the cavity (25) is set larger than a first collision angle ($\alpha 1$) at which a first fuel injection axis (Li1), oriented in a direction in which the width (W1) is small, collides with the cavity (25).

4. A direct fuel-injection engine comprising a piston (13) having a top face with a height that varies in the circumferential direction, a cavity (25) recessed in a central part of the piston (13), and a fuel injector (23) for injecting fuel along a plurality of fuel injection axes (Li1, Li2) oriented in a plurality of directions spaced in the circumferential direction within the cavity (25), characterized in that the ridge length of a squish area (SA) changes in the circumferential direction, and a second collision angle ($\alpha 2$) at which a second fuel injection axis (Li2), oriented in a direction in which the ridge length is large, collides with the cavity (25) is set larger than a first collision angle ($\alpha 1$) at which a first fuel injection axis (Li1), oriented in a direction in which the ridge length is small, collides with the cavity (25).

5. A direct fuel-injection engine comprising a piston (13) having a top face with a height that varies in the circumferential direction, a cavity (25) recessed in a central part of the piston (13), and a fuel injector (23) for injecting fuel along a plurality of fuel injection axes (Li1, Li2) oriented in a plurality of directions spaced in the circumferential direction within the cavity (25), characterized in that a squish clearance (C1, C2) changes in the circumferential direction, and a second collision angle ($\alpha 2$) at which a second fuel injection axis (Li2), oriented in a direction in which the squish clearance (C2) is small, collides with the cavity (25) is set larger than a first collision angle ($\alpha 1$) at which a first fuel injection axis (Li1), oriented in a direction in which the squish clearance (C1) is large, collides with the cavity (25).

6. The direct fuel-injection engine according to any one of claim 1 to claim 5, wherein the second collision angle ($\alpha 2$) is at least 90°.

7. The direct fuel-injection engine according to any one of claim 1 to claim 5, wherein a cross section of the cavity (25) that passes through an $n^{th}$ fuel injection axis (Li1, Li2) is defined as a fuel injection cross section Sn, an intersection point of the fuel injection cross section Sn with the opening peripheral edge of the cavity (25) is defined as a first specific point An, a second specific point Bn is present on a line that passes through the first specific point An and is parallel to a lower face of a cylinder head (16) in the fuel injection cross section Sn, a third specific point Cn is present on a bottom wall portion (25c) of the cavity (25) in the fuel injection cross section Sn, the second specific point Bn is at a position closer to a piston central axis (Lp) than to the first specific point An, the third specific point Cn is at a position closer to the piston central axis (Lp) than to a position of the maximum outer diameter of the bottom wall portion (25c) of the cavity (25), and a cross-sectional shape surrounded by a path AnBn connecting the first and second specific points An and Bn by a line along the lower face of the cylinder head (16) in the fuel injection cross section Sn, a path AnCn connecting the first and third specific points An and Cn along a wall face of the cavity (25) in the fuel injection cross section Sn, and a path BnCn connecting the second and third specific points Bn and Cn by the shortest straight line is substantially equal for each fuel injection cross section Sn.

8. The direct fuel-injection engine according to any one of claim 1 to claim 5, wherein fuel injected by the fuel injector (23) collides with the cavity (25) before the piston (13) reaches top dead center.

9. A direct fuel-injection engine comprising a piston (13) having a top face with a height that varies in the circumferential direction, a cavity (25) recessed in a central part of the piston (13), and a fuel injector (23) for injecting fuel along a plurality of fuel injection axes (Li1, Li2) oriented in a plurality of directions spaced in the circumferential direction within the cavity (25), characterized in that the magnitude of reverse squish flow changes in the circumferential direction, and a second fuel injection angle ($\beta 2$) formed by a second fuel injection axis (Li2), oriented in a direction in which the reverse squish flow is large, relative to the direction of the open end of the cavity (25) is set larger than a first fuel injection angle ($\alpha 1$) formed by a first fuel injection axis (Li1), oriented in a direction in which the reverse squish flow is small, relative to the direction of the open end of the cavity (25).

10. A direct fuel-injection engine comprising a piston (13) having a top face with a height that varies in the circumferential direction, a cavity (25) recessed in a central part of the piston (13), and a fuel injector (23) for injecting fuel along a plurality of fuel injection axes (Li1, Li2) oriented in a plurality of directions spaced in the circumferential direction within the cavity (25), characterized in that a squish area (SA) changes in the circumferential direction, and a second fuel injection angle (α2) formed by a second fuel injection axis (Li2), oriented in a direction in which the squish area (SA) is large, relative to the direction of the open end of the cavity (25) is set larger than a first fuel injection angle (β1) formed by a first fuel injection axis (Li1), oriented in a direction in which the squish area (SA) is small, relative to the direction of the open end of the cavity (25).

11. A direct fuel-injection engine comprising a piston (13) having a top face with a height that varies in the circumferential direction, a cavity (25) recessed in a central part of the piston (13), and a fuel injector (23) for injecting fuel along a plurality of fuel injection axes (Li1, Li2) oriented in a plurality of directions spaced in the circumferential direction within the cavity (25),
characterized in that a width (W1, W2) of a squish area (SA) changes in the circumferential direction, and a second fuel injection angle (β2) formed by a second fuel injection axis (Li2), oriented in a direction in which the width (W2) is large, relative to the direction of the open end of the cavity (25) is set larger than a first fuel injection angle (β1) formed by a first fuel injection axis (Li1), oriented in a direction in which the width (W1) is small, relative to the direction of the open end of the cavity (25).

12. A direct fuel-injection engine comprising a piston (13) having a top face with a height that varies in the circumferential direction, a cavity (25) recessed in a central part of the piston (13), and a fuel injector (23) for injecting fuel along a plurality of fuel injection axes (Li1, Li2) oriented in a plurality of directions spaced in the circumferential direction within the cavity (25),
characterized in that a ridge length of a squish area (SA) changes in the circumferential direction, and a second fuel injection angle (β2) formed by a second fuel injection axis (Li2), oriented in a direction in which the ridge length is large, relative to the direction of the open end of the cavity (25) is set larger than a first fuel injection angle (α1) formed by a first fuel injection axis (Li1), oriented in a direction in which the ridge length is small, relative to the direction of the open end of the cavity (25).

13. A direct fuel-injection engine comprising a piston (13) having a top face with a height that varies in the circumferential direction, a cavity (25) recessed in a central part of the piston (13), and a fuel injector (23) for injecting fuel along a plurality of fuel injection axes (Li1, Li2) oriented in a plurality of directions spaced in the circumferential direction within the cavity (25),
characterized in that a squish clearance (C1, C2) changes in the circumferential direction, and a second fuel injection angle (β2) formed by a second fuel injection axis (Li2), oriented in a direction in which the squish clearance (C2) is small, relative to the direction of the open end of the cavity (25) is set larger than a first fuel injection angle (α1) of a first fuel injection axis (Li1), oriented in a direction in which the squish clearance (C1) is large, relative to the direction of the open end of the cavity (25).

14. The direct fuel-injection engine according to any one of claim 9 to claim 13, wherein a cross section of the cavity (25) that passes through an $n^{th}$ fuel injection axis (Li1, Li2) is defined as a fuel injection cross section Sn,
an intersection point of the fuel injection cross section Sn with the opening peripheral edge of the cavity (25) is defined as a first specific point An,
a second specific point Bn is present on a line that passes through the first specific point An and is parallel to a lower face of a cylinder head (16) in the fuel injection cross section Sn,
a third specific point Cn is present on a bottom wall portion (25c) of the cavity (25) in the fuel injection cross section Sn,
the second specific point Bn is at a position closer to a piston central axis (Lp) than to the first specific point An,
the third specific point Cn is at a position closer to the piston central axis (Lp) than to a position of the maximum outer diameter of the bottom wall portion (25c) of the cavity (25), and
a cross-sectional shape surrounded by a path AnBn connecting the first and second specific points An and Bn by a line along the lower face of the cylinder head (16) in the fuel injection cross section Sn, a path AnCn connecting the first and third specific points An and Cn along a wall face of the cavity (25) in the fuel injection cross section Sn, and a path BnCn connecting the second and third specific points Bn and Cn by the shortest straight line is substantially equal for each fuel injection cross section Sn.

* * * * *

UNITED STATES PATENT AND TRADEMARK OFFICE
CERTIFICATE OF CORRECTION

| | |
|---|---|
| PATENT NO. | : 8,474,431 B2 |
| APPLICATION NO. | : 12/532984 |
| DATED | : July 2, 2013 |
| INVENTOR(S) | : Hiroshi Sono |

It is certified that error appears in the above-identified patent and that said Letters Patent is hereby corrected as shown below:

On the Title Page, Item (54) and in the Specification, Column 1, Line 1, Title should read:

--DIRECT FUEL-INJECTION ENGINE--

Signed and Sealed this
Twelfth Day of November, 2013

Teresa Stanek Rea
*Deputy Director of the United States Patent and Trademark Office*